United States Patent
MacGillivray (10) Patent No.: US 11,559,047 B2
(45) Date of Patent: Jan. 24, 2023

(54) METHOD OF USING A LIFTING POST FOR CLEANING A NET OF A SEA PEN

(71) Applicant: MOWI ASA, Bergen (NO)

(72) Inventor: David MacGillivray, Fort William (GB)

(73) Assignee: MOWI ASA, Bergen (NO)

( * ) Notice: Subject to any disclaimer, the term of this patent is extended or adjusted under 35 U.S.C. 154(b) by 8 days.

(21) Appl. No.: 16/630,739

(22) PCT Filed: Jul. 9, 2018

(86) PCT No.: PCT/NO2018/050180
§ 371 (c)(1),
(2) Date: Jan. 13, 2020

(87) PCT Pub. No.: WO2019/013643
PCT Pub. Date: Jan. 17, 2019

(65) Prior Publication Data
US 2020/0187464 A1 Jun. 18, 2020

(30) Foreign Application Priority Data

Jul. 14, 2017 (NO) .................................... 20171184
Jun. 7, 2018 (NO) .................................... 20180780

(51) Int. Cl.
*A01K 61/60* (2017.01)
(52) U.S. Cl.
CPC .................................. *A01K 61/60* (2017.01)
(58) Field of Classification Search
CPC ........ A01K 61/00; A01K 61/10; A01K 61/60; A01K 61/70; A01K 63/10; A01K 69/54; A01K 69/59; B63C 7/06
(Continued)

(56) References Cited

U.S. PATENT DOCUMENTS

| 4,013,042 A | * | 3/1977 | Ingold | A01K 61/60 |
| | | | | 119/223 |
| 4,034,693 A | * | 7/1977 | Challenger | A01K 69/08 |
| | | | | 114/333 |

(Continued)

FOREIGN PATENT DOCUMENTS

| CN | 106386612 | 2/2017 | |
| JP | 2016054679 A | * 4/2016 | ............. A01K 63/04 |

(Continued)

OTHER PUBLICATIONS

Norwegian Search Report for NO 20171184, dated Dec. 11, 2017.
(Continued)

*Primary Examiner* — Brady W Frazier
(74) *Attorney, Agent, or Firm* — Andrus Intellectual Property Law, LLP (57) ABSTRACT

Method for air drying a fouled net portion of a net comprising the fouled net portion and a clean net portion in a circular sea pen. The method includes the steps of: a) fastening lifting posts to the pen on a drying side; b) attaching slidingly internal ropes to the net; c) fitting winches to the lifting posts on a drying side; d) connecting an energy source to the winches; e) releasing a suitable part of a clean net portion from a handrail; f) fastening the internal rope to a winch; g) bringing a part of the fouled net portion into the air by pulling the internal rope with the winch; h) fastening a part of the fouled net portion to the handrail; and i) repeating steps e)-h) until the complete fouled net portion is lifted into the air. The invention regards also lifting posts to carry out the method.

2 Claims, 9 Drawing Sheets

(58) Field of Classification Search
USPC ....... 119/200, 201, 204, 208, 215, 221, 223, 119/232, 234, 238, 239, 241; 114/50, 51
See application file for complete search history.

(56) References Cited

U.S. PATENT DOCUMENTS

| | | | | |
|---|---|---|---|---|
| 4,892,059 | A * | 1/1990 | Yoneyama | A01K 61/60 119/223 |
| 6,581,543 | B1 * | 6/2003 | Kolberg | A01K 61/60 119/223 |
| 7,690,544 | B2 * | 4/2010 | Zaruba | B65H 57/14 226/186 |
| 2019/0045754 | A1 * | 2/2019 | Naess | A01K 61/60 |

FOREIGN PATENT DOCUMENTS

| | | |
|---|---|---|
| NO | 318480 | 3/2005 |
| NO | 20130676 | 11/2014 |
| NO | 337764 | 6/2016 |
| WO | 0135736 | 5/2001 |
| WO | 2010015852 | 2/2010 |
| WO | 2010134825 | 11/2010 |
| WO | 2014189383 | 11/2014 |

OTHER PUBLICATIONS

Norwegian Search Report for NO 20180780 dated Nov. 26, 2019.
International Search Report and the Written Opinion for PCT/NO2018/050180, dated Oct. 9, 2018.

* cited by examiner

Fig. 12E

METHOD OF USING A LIFTING POST FOR CLEANING A NET OF A SEA PEN

CROSS-REFERENCE TO RELATED APPLICATIONS

This application is the U.S. national stage application of International Application PCT/NO2018/050180, filed Jul. 9, 2018, which international application was published on Jan. 17, 2019, as International Publication WO 2019/013643 in the English language. The International Application claims priority of Norwegian Patent Application Nos. 20171184, filed Jul. 14, 2017 and 20180780, filed Jun. 7, 2018. The international application and Norwegian applications are all incorporated herein by reference, in entirety.

FIELD

This invention regards a method for cleaning a net in a circular plastic sea pen. Such sea pen is used for farming fish and the sea pen comprises a net as a confinement for fish. Due to fouling, the net needs to be cleaned from time to time. More particularly, the invention regards a method for cleaning the net by air drying, i.e. the net is lifted up into the air and kept in air for some time. Even more particularly, the invention regards a method for lifting the net into the air without use of a crane on-board a vessel. In addition, the invention regards a lifting post for carrying out the method. The lifting post may be retrofitted to a circular plastic sea pen.

BACKGROUND

Fish farms for raising fish in sea water comprise, for the most part, so-called open sea pens. The open sea pen comprises a buoyancy element and a net which forms a confinement for the fish. The net is an open structure which allows water currents to pass through the pen. The water current supplies the pen with water of high oxygen content, which is important for the well-being of the fish.

There are basically two types of sea pens. One type is the plastic sea pen which comprises two or three concentric floating rings formed of plastic. The floating rings serve as the buoyancy element. Such a sea pen is large with a circumference of 100 meters or more. The other type is the steel sea pen. Such a sea pen is made of a steel frame that provides a gangway around the net. Buoyancy elements are located on the underside of the gangway. Seen from above the gangway forms a square for the net.

The steel sea pen comprises several nets side by side separated by the gangway. The nets in a steel sea pen are smaller than the nets in a plastic sea pen. Steel sea pens cannot stand large waves in the same manner as the flexible plastic rings of the plastic sea pen. Therefore, steel sea pens are located in more sheltered areas.

The net will over time be covered by fouling organisms. The fouling reduces the flow of water through the net, increases the weight of the net and increases the drag force between the sea pen and the water current. In addition, harmful organisms such as sea lice larvae and amoeba may be located in the fouling.

Operators at a fish farm will keep each net as clean as possible. There are several known ways of doing this. The net may be impregnated with antifouling agents such as copper-based antifouling agents. Such means are, however, harmful to the environment and have in some jurisdictions been banned. The entire net may be shifted and transported to a site for cleaning. This is a complicated operation especially when there are fish in the sea pen. The fouled net is lifted by a crane on a vessel and a clean net replaces the fouled net. The fish is at the same time directed from the fouled net to the clean net. There is a risk that the nets will be teared during the operation and that fish may escape through rips. Fish may also escape due to other accidents through such an operation. As an alternative, the net may be cleaned on site by cleaning devices that pass over the net surface. The cleaning device may comprise stationary or rotary brushes or nozzles fed with high pressure water. In most cases, such a cleaning device is operated from a vessel that moves along the outside of the sea pen.

An alternative method for handling fouling has been developed for steel sea pens. The net is of approximately double size. One part of the net is lifted out of the sea water and allowed to dry in air. It is also exposed to rain. The marine organisms in the fouling will die from desiccation and the exposure to fresh water. The part of the net that is lifted out of the sea water is fastened to a railing. After about a fortnight the dived net with fouling is lifted out of the sea water. The dried and clean net is released and replaces the dived net. The net is a continuous net. Pulling and lifting the net at one side makes the other side to slide into the sea water. Dead fouling will loosen from the net when it is positioned in the sea water and the net appears clean.

The net itself is heavy and the fouling makes it even heavier. The net is lifted by several posts positioned at lifting stations. Each post comprises a winch. These are transported around on the gangway to the position or lifting station where they are needed. Three posts are needed for the operation.

The approach of cleaning nets by air drying has not been used for the circular sea pens. This is partly due to that the circular floating rings, which form the buoyancy elements, do not provide a solid gangway for transport of equipment. In addition, the net is larger. The net is handled by a crane from a vessel. Due to the size of the net, more than three lifting stations are needed. There is then a need for several vessels, and the operation will become too expensive.

SUMMARY

The invention has for its object to remedy or to reduce at least one of the drawbacks of the prior art, or at least provide a useful alternative to prior art.

The object is achieved through features, which are specified in the description below and in the claims that follow.

The inventor has provided a lifting post that may be retrofitted to the plastic buoyancy element of a plastic sea pen and may be firmly attached to the buoyancy element. The lifting post may be provided with a detachable hydraulic winch. The winches are provided with hydraulic power from a power unit onboard a single vessel and may all be operated individually but at the same time.

The inventor has provided a method where about a half of a net portion in a circular plastic sea pen is air dried and where the remaining half of a net portion is dived and forms the enclosure for the fish. The net according to the method comprises two complete nets, each net with a wall and a bottom portion. The two nets are sewn together along a headline of each net. About half of the headline of a first net is sewn together with about half of the headline of a second net. In what follows any reference to a net, the net or one net means the two nets sewn together as described. One portion of the net will be termed the fouled net portion. The remaining portion of the net will be termed the clean net portion.

The clean net portion is lifted out of the sea water and allowed to dry in air. The clean net portion is fixed to a railing of the sea pen.

The wall of the fouled net portion is a continuous wall. The wall may be substantially cylindrical in shape or somewhat tapered towards the bottom portion. The bottom portion, hereafter termed the base, may be conical shaped. In what follows, half the wall of the fouled net portion will be termed the front wall and the remaining wall will be termed the back wall. The front wall is the first part of the fouled net portion to be lifted out of water. This applies in a similar manner to the clean net portion, however, with the difference that the front wall is the first part of the clean net portion to be submerged when the clean net portion is released from the handrail. The method comprises to provide a number of lifting posts adapted for retrofitting the lifting posts to the buoyancy element. The lifting post may also be fixed to the handrail of the plastic sea pen. In particular each lifting post is fastened to a vertical post of the handrail and to a bracket joining two concentric floating rings. A minimum of eight lifting posts are positioned and fastened around the circumference of the sea pen. It is advantageous that the lifting posts are equidistantly positioned around the circumference. Ten lifting posts, twelve lifting posts or even more lifting posts may be positioned and fastened around the sea pen. In an alternative embodiment the lifting post comprises a stem holder and a detachable stem body. The stem holder is connected to a base por-n tion which is provided with a first fastening means for connecting the lifting post to the buoyancy element. In this embodiment a minimum of eight stem holders are positioned and fastened around the circumference of the sea pen. It is advantageous that the stem holders are equidistantly positioned around the circumference. Ten stem holders, twelve stem holders or even more stem holders may be positioned and fastened around the sea pen.

The method for air drying the fouled net portion comprises some initial preparation steps. The bottom of the fouled net portion is lifted to the surface to release the fouled net portion from a bottom ring. The bottom ring is also known as a sinker tube. Some sea pens are provided with weights between the bottom ring and the lower portion of the dived net. Such weights are released from the fouled net portion. Water line ties which connect the fouled net portion to the buoyancy element, are released such that the fouled net portion may be displaced relative to the buoyancy element.

The net is provided with internal ropes. These internal ropes are the ropes used for pulling the net during the operation. Each internal rope is slidingly fastened to the inside of the net by an eye connection. The portion of the internal ropes at the clean net portion is uncoiled. Thereafter the front wall of the clean net portion is released from the handrail.

A detachable winch is fitted to each of the lifting posts that will be engaged in the operation. Typically, this will be four lifting posts side by side at the opposite side of the sea cage relative to the side where the clean net portion is positioned.

A first set of internal ropes of the fouled net portion are put onto the winches and the first lift is commenced. The front wall of the fouled net portion is brought into the air by the first lift. The front wall of the fouled net portion is fastened to the handrail. The front wall of the clean net portion is dropped into the water.

Tail ends of a second set of internal ropes have hit the surface after the first lift. The tail ends of the second set of internal ropes are put onto the winches. The second lift is then commenced. In this second lift, half the base of the fouled net portion is brought into the air. This part of the base of the fouled net portion is fastened to the handrail. The part of the clean net portion that will form a first half of the base of the enclosure after operation is dropped into the water.

Tail ends of a third set of internal ropes have hit the surface after the second lift, and the tail ends of the third set of internal ropes are put onto the winches. The third lift is then commenced. In this third lift, the second half of the base of the fouled net portion is brought into the air. The second half of the base of the fouled net portion is fastened to the handrail. The portion of the clean net that will form a second half of the base of the enclosure after operation, is dropped into the water.

Tail ends of a fourth set of internal ropes have hit the surface after the third lift, and the tail ends of the fourth set of internal ropes are put onto the winches. The fourth and final lift is then commenced. In this fourth lift, the back wall of the fouled net portion is brought into the air. The back wall of the fouled net portion is fastened to the handrail. The remaining parts of the clean net portion is dropped into the water.

The sequence of dropping parts of the clean net portion may deviate from the previous description as the sequence can change slightly from sea pen to sea pen depending in net size, weather and tide. During a sequence of four lifts, the front wall of the clean net portion may be dropped into the water at the second lift, the first half of the base is dropped into water at the third lift, and the remining parts of the clean net portion is dropped into water at the final fourth lift.

It is important to the method that lifting is co-ordinately carried out at all four lifting posts and at the same time to spread the load on the net and the buoyancy element.

The number of lifts may deviate from the description above depending on the size of the net and other factors. The number of lifting posts may deviate from four.

In a first aspect the invention relates more particularly to a lifting post for a sea pen, said lifting post comprises an elongated stem with a base portion and an opposite free end portion, the stem is provided with a fastening organ for a detachable winch between the base and the free end portion, and a pull portion above the fastening organ, and the base portion is provided with a first fastening means for connecting the lifting post to at least two concentric floating rings of a circular sea pen.

The stem may be provided with a second fastening means for connecting the lifting post to a handrail of a railing of the circular sea pen. The second fastening means may be adapted to be fastened to a vertical pillar of the railing of the circular sea pen.

The base portion may comprise a stem holder and the stem may comprise an elongated stem body arranged to be detachable connected to the stem holder. The elongated stem body may be positioned and fixed within the stem holder. As an alternative embodiment the elongated stem body may be positioned and fixed on the outside of the stem holder.

The first fastening means may comprise an upper clamp bracket and a lower clamp bracket arranged to surround a plastic bracket, said plastic bracket connecting the two plastic rings. The upper clamp and the lower clamp may be tightened around the plastic clamp to provide a firm connection between the plastic rings and the lifting post.

The first fastening means may comprise a fastener for a connection to a bottom ring. The fastener may be a clamp bracket. The fastener may be at the opposite side of the handrail. A connection element may at a first end portion be fixed to the fastener and at a second opposite end portion be fixed to a bottom ring. The connection element may in a portion comprise a chain, a wire or a rope. The weight of the bottom ring may provide a counter weight for the lifting post.

In a second aspect the invention relates more particularly to a method for air drying a fouled net portion of a net comprising the fouled net portion and a clean net portion, said net being positioned in a circular sea pen, where the method comprises the steps of:

a) provide a number of lifting posts or stem holders as described above, and fasten the lifting posts or stem holders to floating concentric rings of the circular sea pen;

b) provide the net with internal ropes, each rope slidingly attached to the net;

c) provide a number of detachable winches, each winch adapted to be fitted to a fastening organ of the lifting post, and fit the winches on the side of the sea pen to which the fouled net portion is to be air dried;

d) provide an energy source for the winches and connect the energy source to the winches;

e) release a suitable part of the clean net portion from a railing or a handrail;

f) fasten the internal rope to a winch;

g) bring a part of the fouled net portion into the air by pulling the internal rope with the winch;

h) fasten the part of the fouled net portion to the railing or the handrail; and i) repeat steps e)-h) until the complete fouled net portion is lifted into the air.

Step c) may further comprise to provide a number of stem bodies and fit the stem bodies to the stem holders before the winch is fitted to the stem holder.

The number of detachable winches for use according to the method is at least three.

The number of detachable winches for use according to the method may be four. As an alternative the number of detachable winches for use according to the method may be five or more than five.

The method may further comprise to lift the base of the fouled net portion to the surface to release the fouled net portion from a bottom ring prior to step e).

The fouled net portion may be completely released from the bottom ring prior to commencing the first lift of the fouled net portion. The complete clean net portion may be dropped into water before the clean net portion is attached to the bottom ring. It is also possible that only a part of the fouled net portion is released from the bottom ring prior to commencing the first lift of the fouled net portion, and the remaining parts of the fouled net portion are released later when convenient. It is also possible that parts of the clean net portion are attached to the bottom ring during the operation when it is practically possible and convenient.

BRIEF DESCRIPTION OF THE DRAWINGS

In the following is described an example of a preferred embodiment illustrated in the accompanying figures, wherein.

DETAILED DESCRIPTION OF THE DRAWINGS

In the drawings, the reference numeral 1 indicates a lifting post for a sea pen 2 (see FIGS. 7, 10 and 12A-E). The lifting post 1 comprises an elongated stem 11 with a base portion 10 and an opposite free end portion 19. The stem 11 is provided with a fastening organ 13 for a detachable winch 3, schematically shown in FIG. 6, between the base portion 10 and the free end portion 19, and a pull portion 15 between the fastening organ 13 and the free end portion 19. The base portion 10 is provided with a first fastening means 100 for connecting the lifting post 1 to a plastic bracket 21 connecting two floating concentric plastic rings 23 of a circular sea pen 2. The stem 11 is shown with a second fastening means 120 for connecting the lifting post 1 to a pillar 220 or a handrail 222 of a railing of the circular sea pen 2. A gangway (not shown) is positioned on top of the plastic rings 23.

Figures 8, 9:
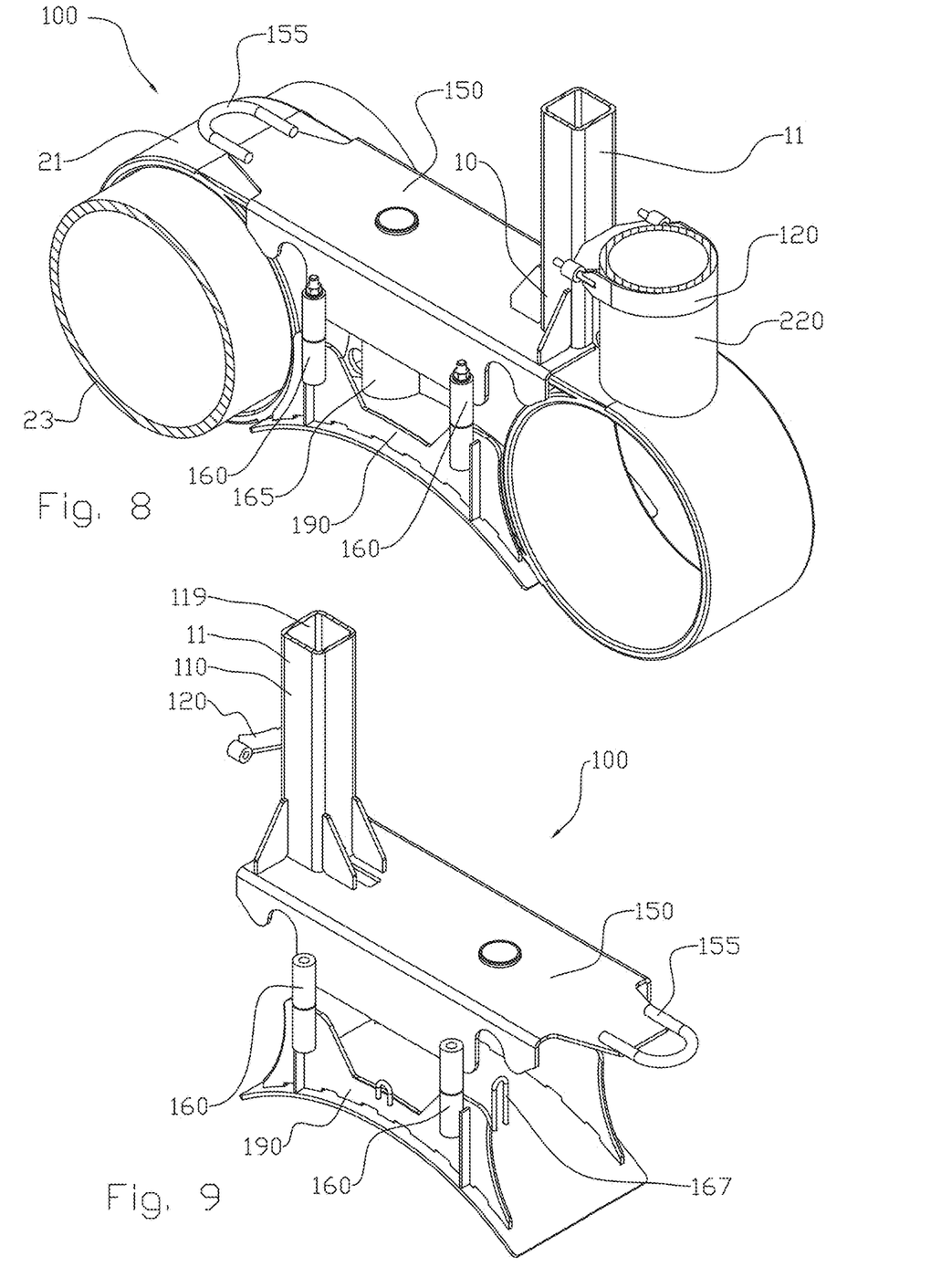
FIG. 8 shows in a larger scale a bracket fastened to a plastic buoyancy element.
FIG. 9 shows in the same scale as FIG. 8, the bracket alone from an opposite direction.
Figure 10:
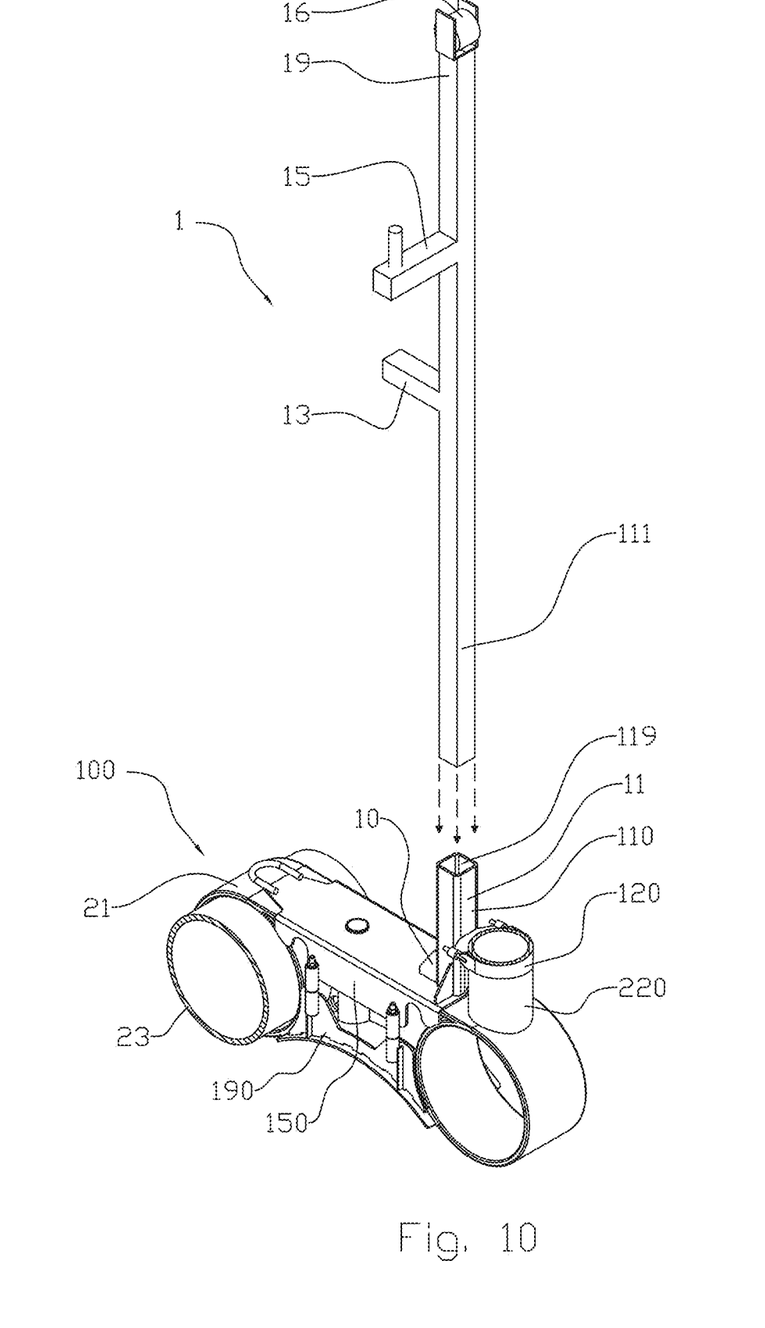
FIG. 10 shows in a smaller scale the same as FIG. 8 and a detachable stem body.

An alternative embodiment for the first fastening means 100 are shown in FIGS. 8-10. The fastening means 100 comprises an upper clamp bracket 150 and a lower clamp bracket 190. As shown in FIG. 8, the upper clamp bracket 150 and the lower clamp bracket 190 surround the plastic bracket 21. The upper clamp bracket 150 and the lower clamp bracket 190 are joined by a bolt connection 160. The upper clamp bracket 150 is provided with a fastener 155 shown as an anchor bar 155. The anchor bar 155 is positioned at the opposite end of the upper clamp bracket 150 relative to the stem 11. A sling strap or similar means may be fastened to the anchor bar 155. A bottom ring (not shown) may be fastened to the clamp bracket 150 via a connection element (not shown). The bottom ring provides a counter weight when a net 4 is lifted at the stem 11.

A locator tube 165 is positioned within the plastic bracket 21 to facilitate the assembly of upper clamp bracket 150 and the lower clamp bracket 190 around the plastic bracket 21 (see FIG. 8). A guide bar 167 (see FIG. 9) is located within the lower clamp bracket 190 and is positioned within the locator tube 165 when the fastening means 100 is assembled. Prior to providing the sea pen 2 with the clamp brackets 150, 190, the connection element for the bottom ring may be guided through the locator tube 165.

The base portion 10 further comprises a stem holder 110 provided with an open end portion 119. The second fastening means 120 is fixed to the stem holder 110. As shown in FIG. 10, the stem 11 further comprises a detachable elongated stem body 111. The lower portion of the stem body 111 is shown to fit inside the stem holder 110. The stem body 111 is at the free end portion 19 shown provided with a sheave 16. An internal rope (not shown) for pulling a net 4 may pass over the pull portion 15 or the sheave 16. The stem body 111 further comprises the fastening organ 13. The stem body 111 may further comprise the pull portion 15 as shown in FIG. 10.

Figure 1:
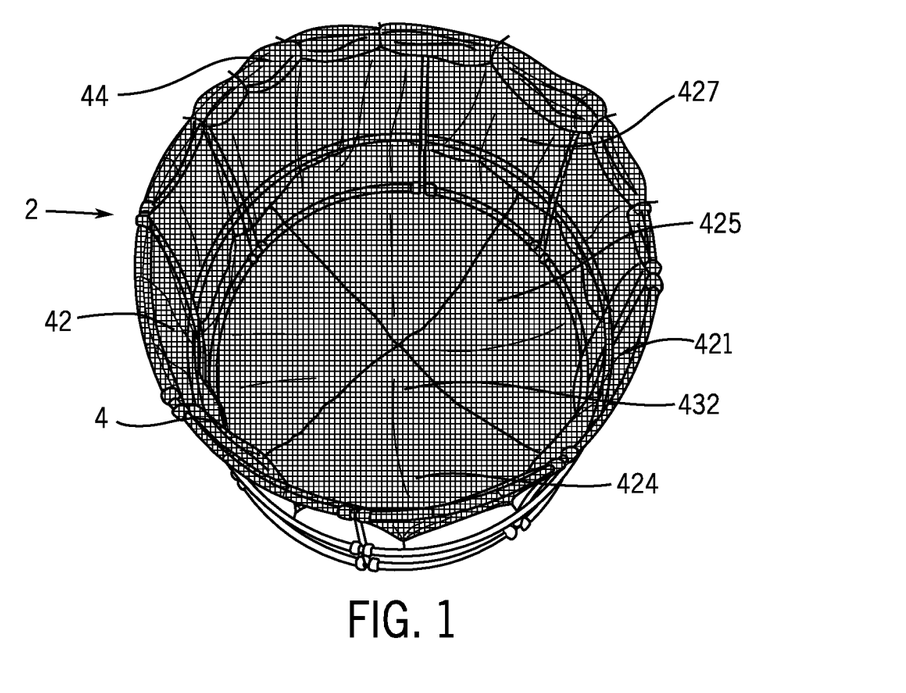
FIG. 1 shows a photo of a model of a sea pen where the clean net portion is fastened to one side of the sea pen according to the invention.
Figure 2:
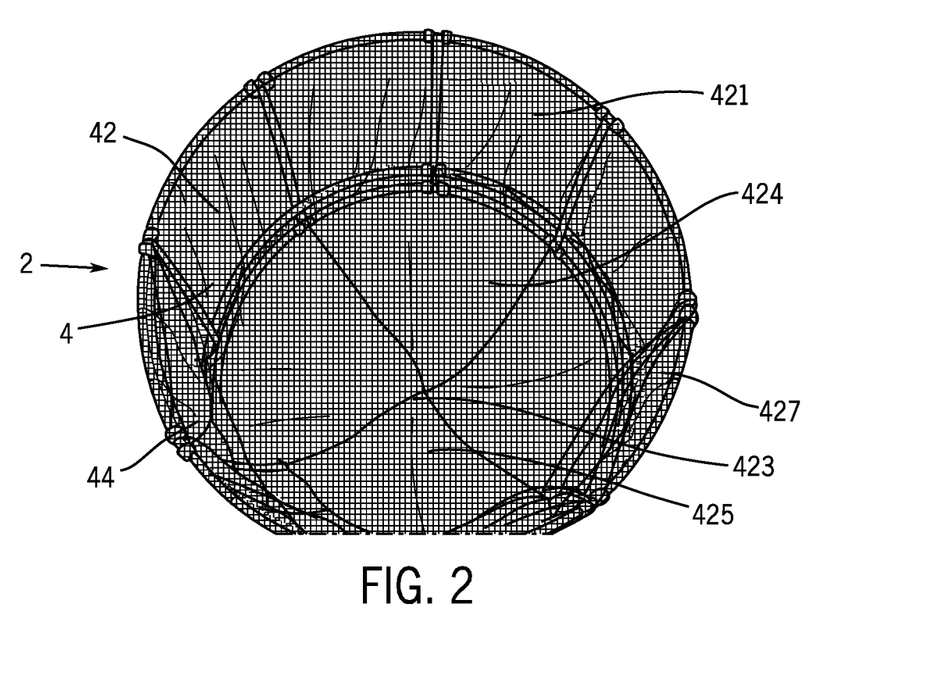
FIG. 2 shows the same as in FIG. 1, but viewed from the opposite side of the model of the sea pen.
Figure 3:
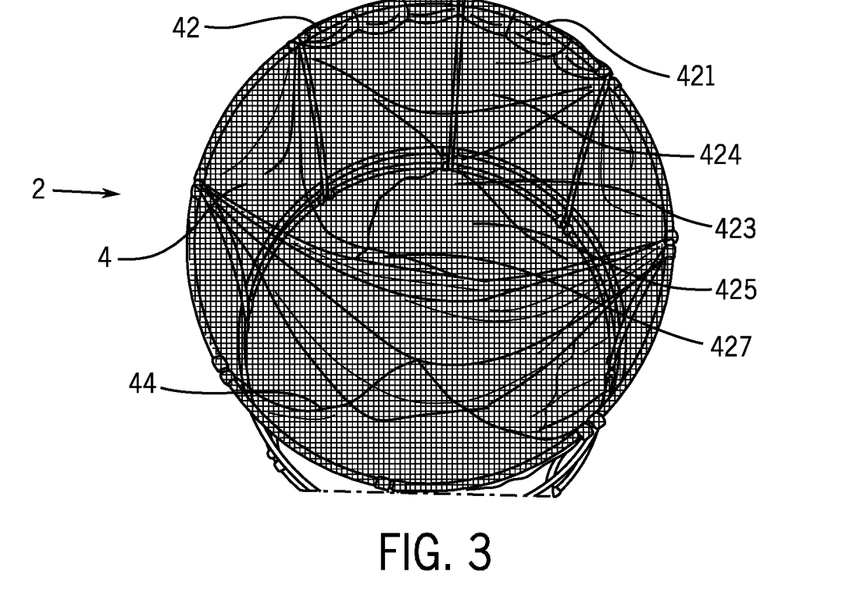
FIGS. 3-5 shows from the same view as FIG. 2, a sequence of how the net is lifted at one side and released at the opposite side.
Figure 4:
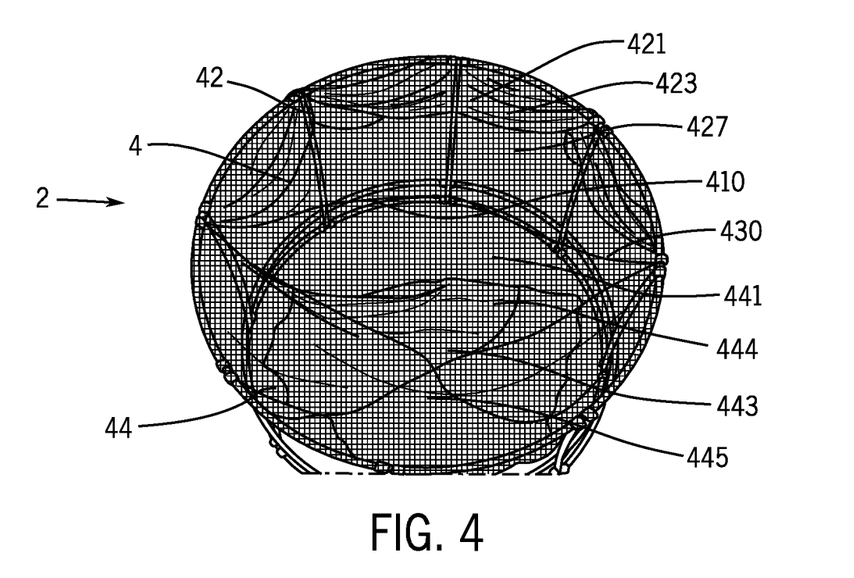
Figure 5:
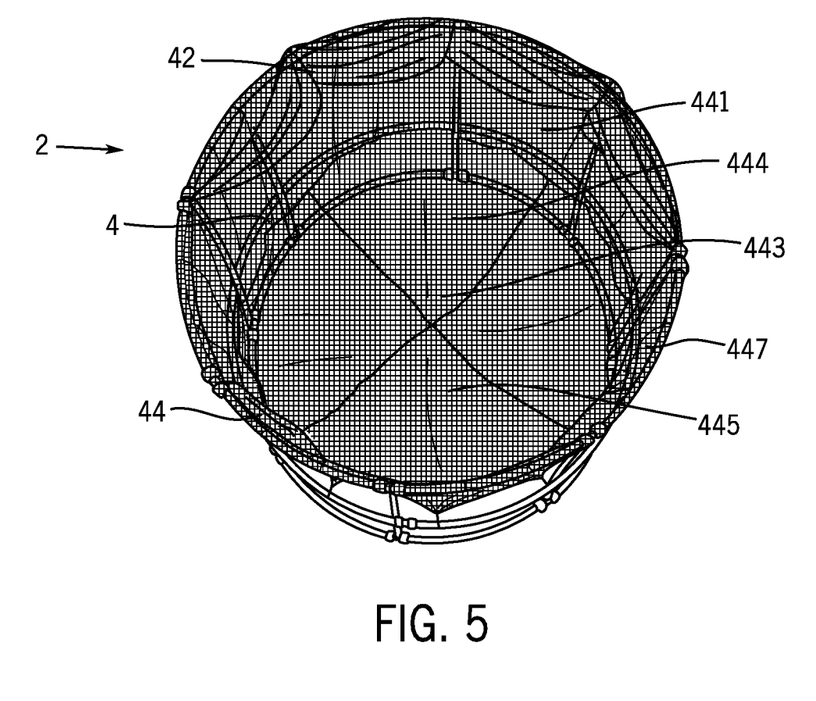
Figure 11A:
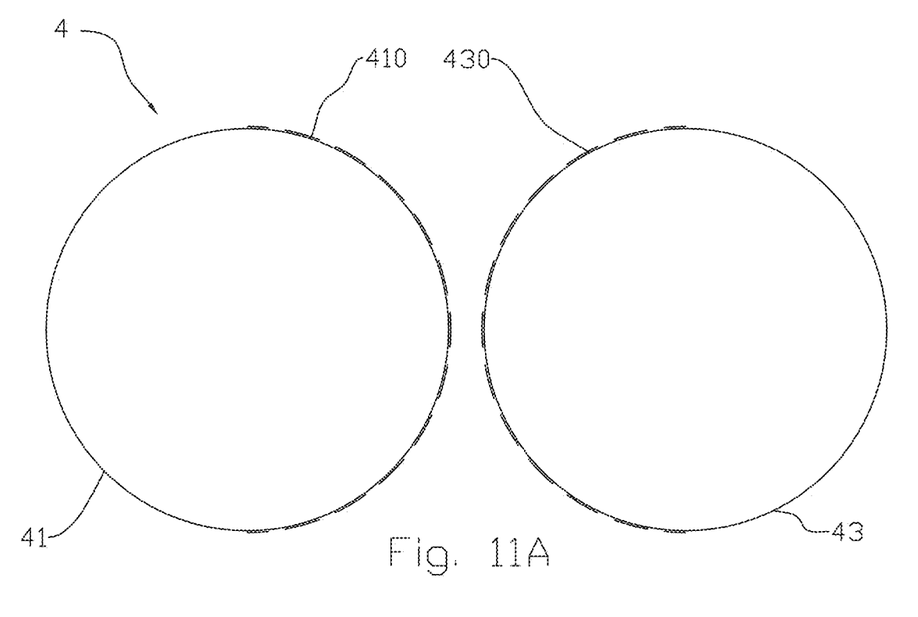
FIG. 11A-B show schematically from above two nets before and after being sewn together along their headlines.
Figure 11B:
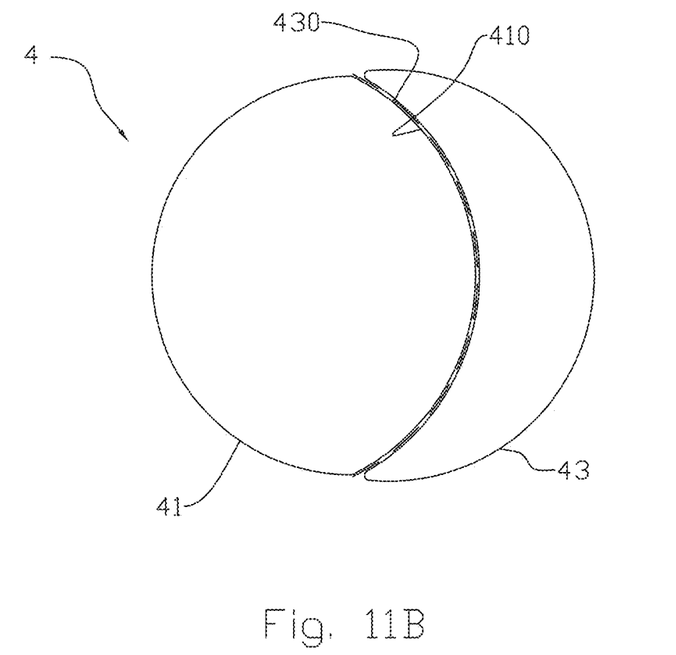
Figure 12A:
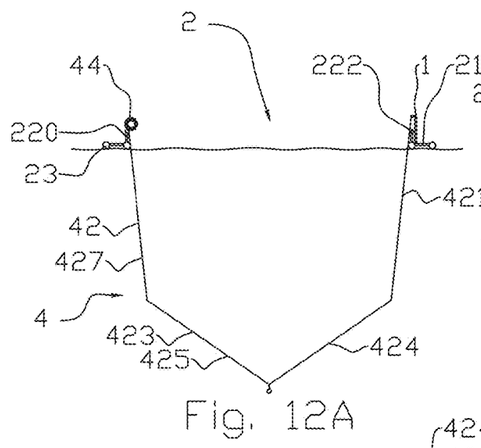
FIG. 12A-E show schematically a side view of a sea pen and a sequence of replacing a fouled net portion with a clean net portion.
Figure 12B:
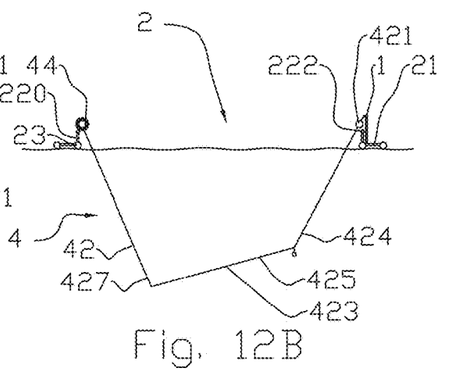
Figure 12C:
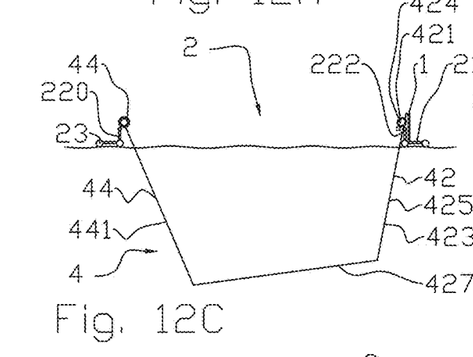
Figure 12D:
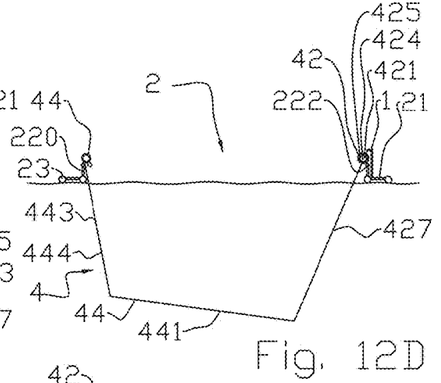
Figure 12E:
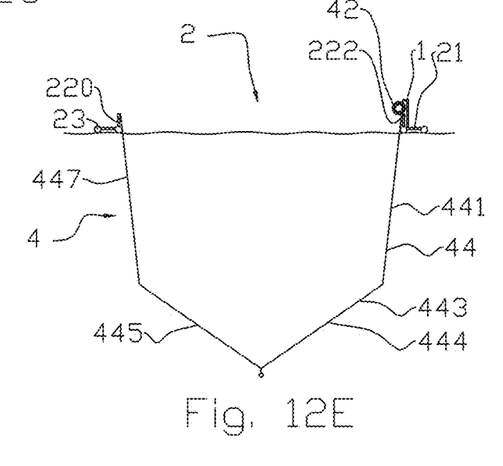

The net 4 comprises two circular nets 41 and 43 that are sewn together along a headline 410, 430 of each net 41, 43 as shown schematically and from above in FIGS. 11A and 11B (see also FIG. 4). About half of the headline 410 of the first circular net 41 is sewn together with about half of the headline 430 of the second net 43.

FIGS. 12A-12E show schematically the sequence of replacing a fouled net portion 42 with a clean net portion 44 of the net 4. The fouled net portion 42 comprises a front wall 421, a base 423 and a back wall 427. The base 423 is divided in a first half base 424 and a second half base 425. The clean net portion 44 comprises a front wall 441, a base 443 and a back wall 447. The base 443 is divided in a first half base 444 and a second half base 445.

Initially, the clean net portion 44 is fully exposed to air. Organisms which previously attached to the clean net portion 44, are killed by desiccation, exposure to fresh water such as rain, and sun radiation. The clean net portion 44 is fixed to the handrail 222 by lashings (not shown).

A detachable winch 3 (see FIG. 6) is fitted to each lifting post 1 that will be engaged in the operation. Typically, there will be four lifting posts 1 side by side at the opposite side of the sea cage 2 relative to the side where the clean net portion 44 is positioned.

A first set of internal ropes (not shown) of the fouled net portion 42 are put onto the winches 3 and the first lift is commenced. The front wall 421 of the fouled net portion 42 is brought into the air by the first lift. The front wall 421 of the fouled net portion 42 is fastened to the handrail 222.

Tail ends of a second set of internal ropes have hit the surface after the first lift. The tail ends of the second set of internal ropes are put onto the winches 3. The second lift is then commenced. In this second lift, half the base 423, 424 of the fouled net portion 42 is brought into the air. This part of the base 423, 424 of the fouled net portion 42 is fastened to the handrail 222. The front wall 441 of the clean net portion 44 is dropped into the water.

Tail ends of a third set of internal ropes have hit the surface after the second lift. The tail ends of the third set of internal ropes are put onto the winches 3. The third lift is then commenced. In this third lift, the second half of the base 423, 425 of the fouled net portion 42 is brought into the air. This second half 425 of the base 423 of the fouled net portion 42 is fastened to the handrail 222. The part of the clean net portion 44 that will form half of the base 443, 444 of the enclosure after operation is dropped into the water.

Tail ends of a fourth set of internal ropes have hit the surface after the third lift. The tail ends of the fourth set of internal ropes are put onto the winches 3. The fourth and last lift is then commenced. In this fourth lift, the back wall 427 of the fouled net portion 42 is brought into the air. The back wall of 427 the fouled net portion 42 is fastened to the handrail 222. The remaining parts, e.g. a second portion 445 of the bottom portion 443 and the back wall 447 of the clean net portion 44 are dropped into the water.

FIGS. 1-5 show the same sequence as described above.

It is important to the method that lifting the net 4 is co-ordinately carried out at all four lifting posts 1 and at the same time to spread the load on the net 4 and the buoyancy element, i.e. the floating concentric plastic rings 23.

The number of lifts may deviate from the description above depending on the size of the net 4 and other factors. The number of lifting posts 1 may deviate from four.

Figure 6:
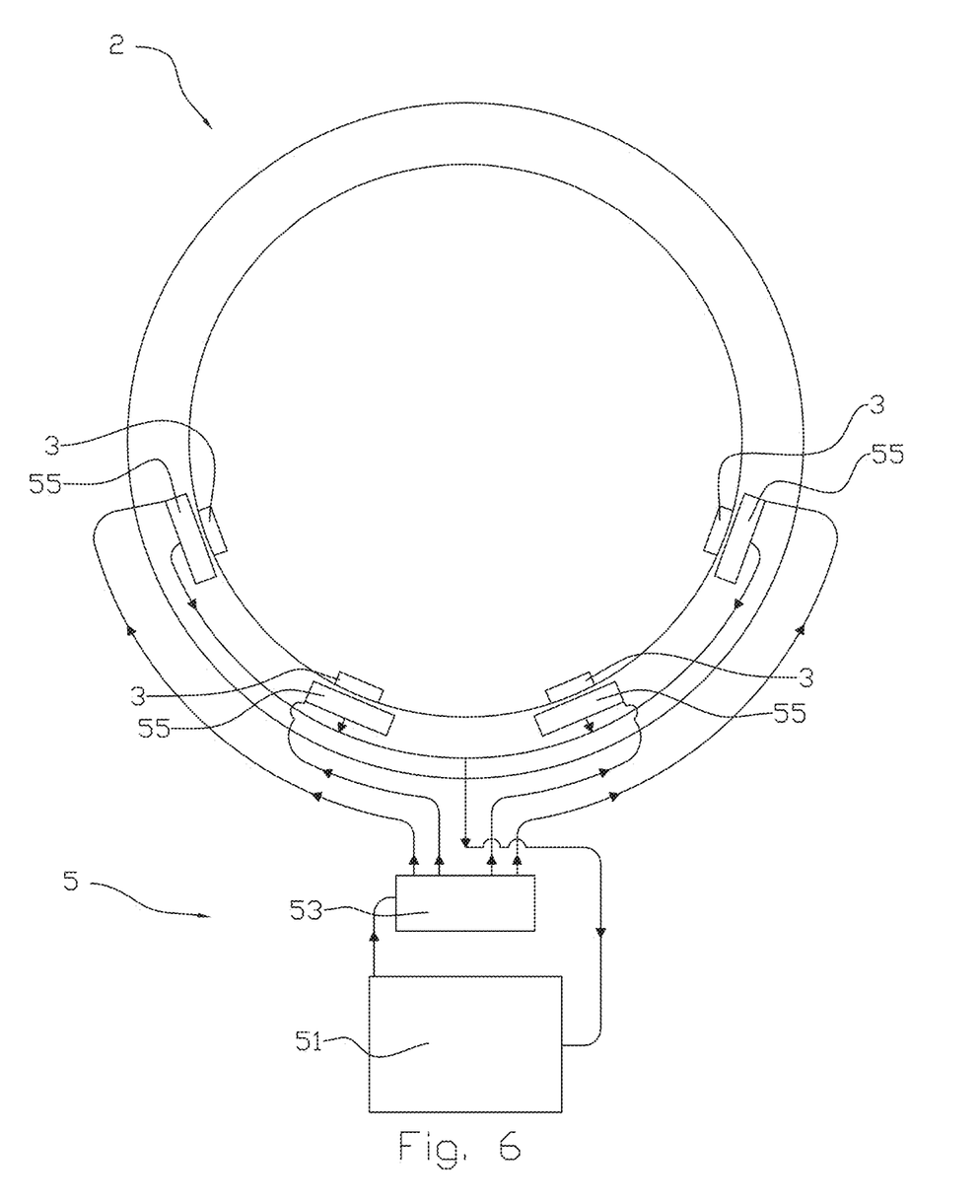
FIG. 6 shows a principal sketch of how each lifting station according to the invention is provided with hydraulic power from a central hydraulic power unit.
Figure 7A:
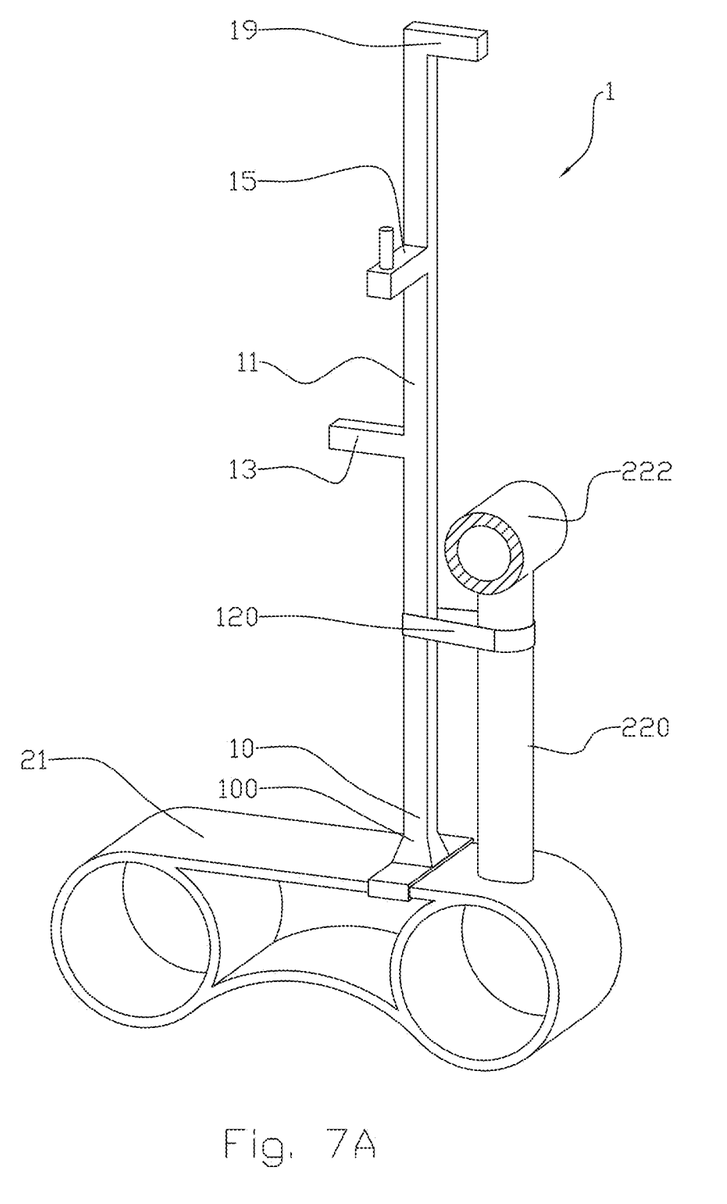
FIG. 7A shows a lifting post that is retrofittable to a plastic bracket of a sea pen.

FIG. 6 shows schematically a hydraulic system 5 for operating the winches 3 attached to the lifting posts 1. The hydraulic system 5 comprises a hydraulic power unit 51, a manifold 53 and a number of valves 55. The valves 55 may be operated by a pedal (not shown) for convenience. Each valve 55 is connected to a detachable winch 3 such that the winch 3 is activated by opening the valve 55 by the pedal. The hydraulic system 5 comprises in addition necessary hydraulic feed lines and hydraulic return lines for connecting the power unit 51, the manifold 53 and the valves 55. The power unit 51 may be positioned onboard a vessel (not shown). The manifold 53 may be positioned onboard the vessel or positioned on the gangway. After the clean net portion 44 has replaced the fouled net portion 42, the hydraulic system 5 is disassem-bled and the winches 3 disconnected from the lifting posts 1. The stem bodies 111 are detached from their stem holders 110. The stem bodies 111, winches 3 and hydraulic system 5 may then be moved to another sea cage 2 or utilized at the opposite side of the sea cage 2 when it is again necessary to replace the fouled net portion 42.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A method for air drying a fouled net portion of a net comprising the fouled net portion and a clean net portion, said net being positioned in a circular sea pen, wherein the method comprises the steps of:
   a) providing a number of lifting posts and fastening the lifting posts to floating concentric rings of the circular sea pen;
   b) providing the net with internal ropes, each rope slidingly attached to the net;
   c) providing a number of detachable winches, each winch adapted to be fitted to a fastening organ of the lifting post, and fitting the winches on the side of the sea pen to which the fouled net portion is to be air dried;
   d) providing an energy source for the winches and connecting the energy source to the winches;
   e) releasing a suitable part of the clean net portion from a handrail;
   f) fastening one of the internal ropes to one of the winches;
   g) bringing a part of the fouled net portion into the air by pulling the fastened internal rope with the winch to which the internal rope is fastened;
   h) fastening a part of the fouled net portion to the handrail; and
   i) repeating steps e)-h) until the complete fouled net portion is lifted into the air.

2. The method according to claim 1, where the method further comprises lifting the base of the fouled net portion to the surface to release the fouled net portion from a bottom ring prior to step e).

\* \* \* \* \*